US011980142B2

(12) United States Patent
Renaux

(10) Patent No.: US 11,980,142 B2
(45) Date of Patent: May 14, 2024

(54) AUTONOMOUS SOLAR-POWERED IRRIGATION SYSTEM

(71) Applicant: Leaf Ninjas Inc., Calgary (CA)

(72) Inventor: Andrew Renaux, Calgary (CA)

(73) Assignee: Leaf Ninja Inc.

( * ) Notice: Subject to any disclaimer, the term of this patent is extended or adjusted under 35 U.S.C. 154(b) by 0 days.

(21) Appl. No.: 17/718,716

(22) Filed: Apr. 12, 2022

(65) Prior Publication Data

US 2023/0320294 A1   Oct. 12, 2023

(51) Int. Cl.
| *A01G 25/16* | (2006.01) |
| *B05B 12/12* | (2006.01) |
| *B25J 9/00* | (2006.01) |
| *H02S 40/38* | (2014.01) |
| *H04W 4/38* | (2018.01) |

(52) U.S. Cl.
CPC ......... *A01G 25/165* (2013.01); *A01G 25/167* (2013.01); *B05B 12/12* (2013.01); *B25J 9/0009* (2013.01); *H02S 40/38* (2014.12); *H04W 4/38* (2018.02)

(58) Field of Classification Search
CPC .... A01G 25/165; A01G 25/167; B05B 12/12; B25J 9/0009; H02S 40/38; H04W 4/38
See application file for complete search history.

(56) References Cited

U.S. PATENT DOCUMENTS

| 8,511,336 B1* | 8/2013 | Schumacher ........... F16K 35/10 137/364 |
| 10,219,447 B1* | 3/2019 | DeCarli ............... B65D 88/005 |
| 11,283,131 B1* | 3/2022 | Carroll .................. H02J 7/0013 |
| 2005/0031416 A1* | 2/2005 | Bishop ................... A01B 45/02 405/37 |
| 2005/0107924 A1* | 5/2005 | Bailey ................. A01G 25/167 700/284 |
| 2008/0027586 A1* | 1/2008 | Hern ..................... G01K 13/00 340/602 |

(Continued)

FOREIGN PATENT DOCUMENTS

| CN | 210671564 U | * | 6/2020 |
| CN | 213848060 U | * | 8/2021 |

*Primary Examiner* — Chad G Erdman
(74) *Attorney, Agent, or Firm* — Gowling WLG (Canada) LLP

(57) ABSTRACT

Disclosed is a system for providing autonomous solar-powered irrigation for a selected wetland site. The system comprises an array of solar PV panels with a charge controller; a deep-cycle battery with a battery monitor; a switchboard with off/on switches for the array of solar PV panels and a deep-cycle battery; a submersible water pump and pump controller; a data logger in communication with the array of one or more solar PV panels, the deep-cycle battery, the charge controller, the battery monitor, the pump controller, and plurality of ambient environmental conditions sensors; and a water-tight container for housing therein the deep-cycle battery, the charge controller, the battery monitor, the pump controller, and the PLC data logger. The PLC data logger is configured for wireless communication with a remote microprocessor having installed a computer-implemented program configured for receiving wireless communications from the PLC data logger, and processing, summarizing and reporting the wireless communications, to an operator.

12 Claims, 10 Drawing Sheets

(56) References Cited

U.S. PATENT DOCUMENTS

| | | | | |
|---|---|---|---|---|
| 2010/0205870 A1* | 8/2010 | Cobb | .................. | E04B 1/34869 |
| | | | | 52/173.3 |
| 2011/0093123 A1* | 4/2011 | Alexanian | .............. | A01G 25/16 |
| | | | | 700/284 |
| 2021/0045301 A1* | 2/2021 | Shakoor | ................. | H04N 23/54 |

* cited by examiner

FIG. 4A
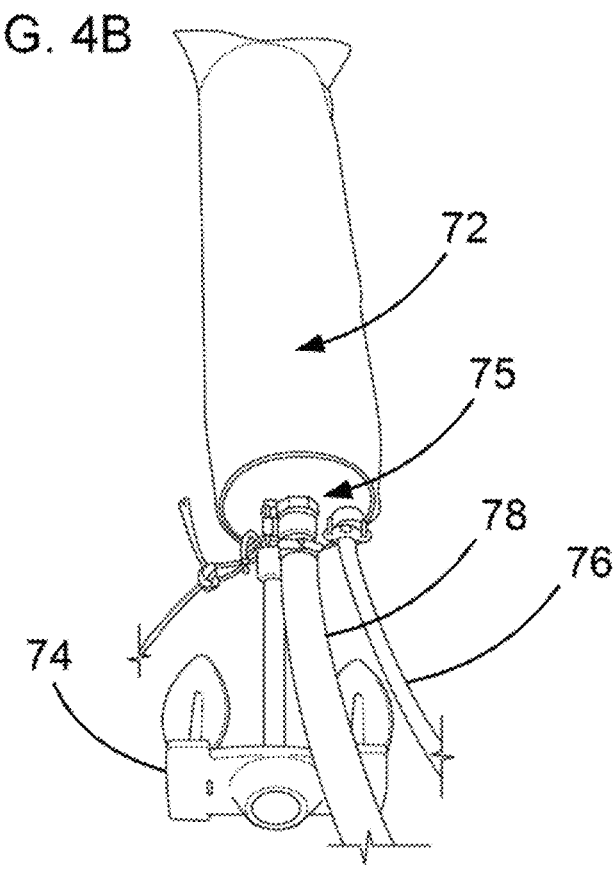
FIG. 4B
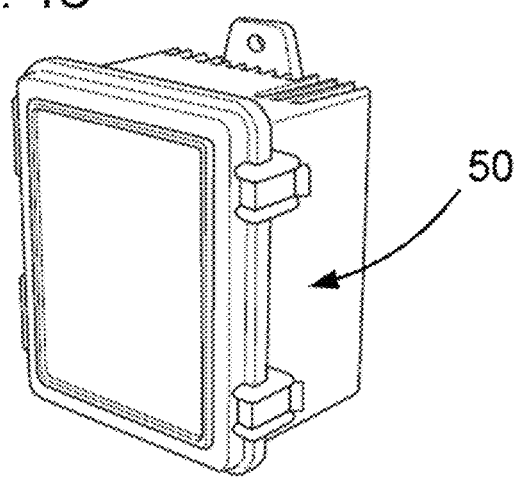
FIG. 4C
FIG. 4

FIG. 9A
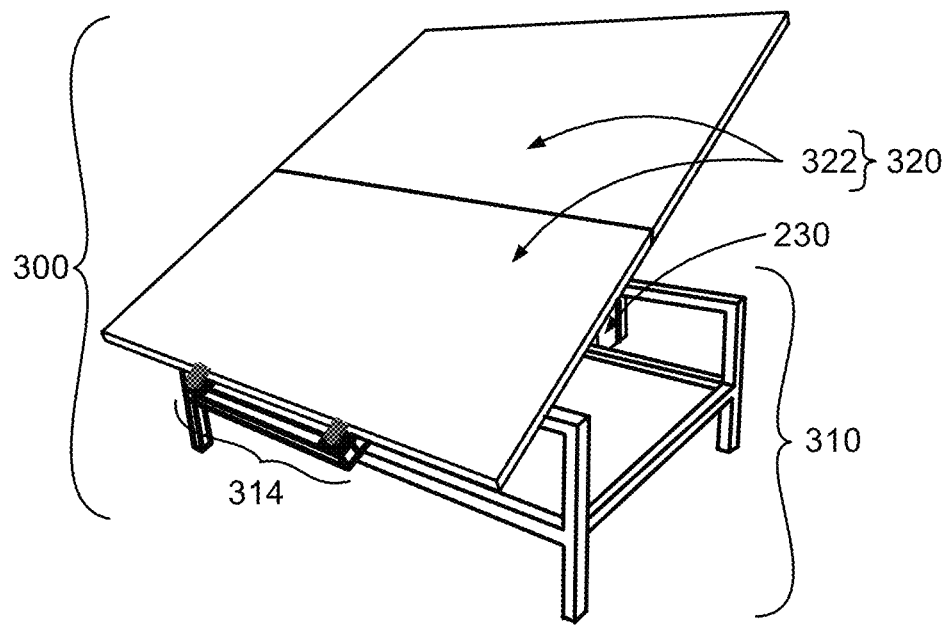
FIG. 9B
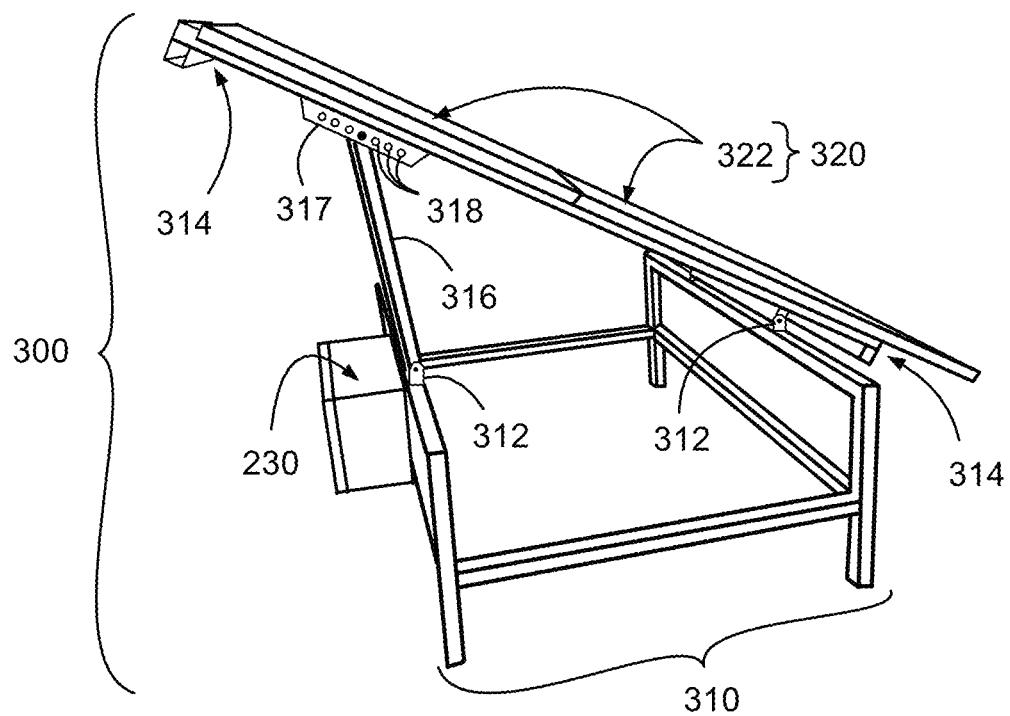
FIG. 9

AUTONOMOUS SOLAR-POWERED IRRIGATION SYSTEM

FIELD

The present disclosure generally relates to irrigation systems for providing outdoor supplemental watering. More specifically, this disclosure pertains to autonomous solar-powered irrigation systems.

BACKGROUND

There have been considerable efforts around the globe in recent years focused on reclamation, remediation and restoration of wetlands that have been significantly damaged by extended pollution from mining activities, terrestrial oil and gas extraction and refining, agricultural runoffs into waterways, commercial marine transport, recreational marine activities, and the like.

The primary reclamation and remediation strategies employed on large scales are based on phytoremediation, which is a bioremediation process that uses plants to remove, transfer, or destroy containments contained therein. In practice, for phytoremediation, selected plants are grown at or adjacent to a water body. As the plants grow, they absorb nutrients as well as inorganic contaminants such as heavy metals and radionuclides through their roots, thereby removing the contaminants from the water body. At the same time, organic contaminants such as pesticides, herbicides, and industrial chemicals may be absorbed and metabolized or transformed by enzymes in the plant or by microorganisms living in association with their roots.

A common practice i most bioremediation processes is to collect a variety of indigenous plants such as perennial grasses, perennial flowering species, woody shrubs and trees that are resident in and adjacent to wetlands in need of remediation. The collected indigenous plants are commonly propagated in outdoor nursery operations to produce vigorous planting stock for transplanting into wetland areas that are in the process of remediation. The indigenous planting stocks are typically hardened off by storage stored outdoors during the fall and winter months whereby they become dormant over winter. Such planting stocks are commonly stored in outdoor shelters that minimize snow load and damage. Transplanting of propagated indigenous plants typically occurs during the spring months after which time, the plants commence their typical spring growth patterns that include establishment of their root systems in the wetland soils accompanied by above-ground vegetative.

A common problem occurring in successfully establishing indigenous planting stocks in wetland soils is the susceptibility of the transplanted plants to environmental fluctuations during their establishment in the wetland ecosystems. Quite often, wetland ecosystems are subject to significant variabilities in springtime temperatures, winds, and rainfalls which are known to have been exacerbated by warming global weather patterns. Consequently, the newly transplanted indigenous plants must establish and grow in wetland environments that do not provide sufficient moisture on a regular basis to facilitate good growth and as a result, may develop stunted growth and/or fail to survive the first spring-summer-fall growing season in a wetland that is being remediated.

It is desirable to provide additional irrigation via sprinkler systems for newly transplanted indigenous plant material using waterways adjacent to the wetlands as sources of irrigation water. However, a problem with many wetland sites where reclamation and phytoremediation activities are undertaken, is that the sites are in remote locations that do not have access to power grids for powering irrigation pumps. In such remote sites, it is common practice to station diesel-powered generators nearby irrigation pumps to pump water from nearby waterways fir sprinkling on to newly transplanted plants that are in the process of establishment and growth in wetland soils. However, the problems with use of diesel generators to provide electrical power on remote wetland phytoremediation sites include the need to regularly refuel the generator, which may result in spillage and exacerbate site pollution, excessive noise that may interfere with the resident wildlife and avian species, and the need for regular site visits to turn on and off the generator and irrigation pumps.

SUMMARY

The embodiments of present disclosure generally relate to systems for providing autonomous solar-powered, self-monitoring, and self-controlling irrigation to plants growing on selected sites, without the need for supplemental power from a power grid or from an onsite combustion-driven generator. Some embodiments generally relate to kits of parts comprising components that may be configured into the systems disclosed herein for providing autonomous solar-powered, self-monitoring, and self-controlling irrigation to plants growing on selected sites.

According to an embodiment of the present disclosure, an example system may comprise an array of solar photovoltaic panels (also referred to herein as solar PV panels), a charge controller in communication with the array of solar PV panels, an irrigation pump, a drip irrigation distribution network in communication with the irrigation pump with a pump controller, a battery with a battery controller in communication with the array of solar PV panels and the irrigation pump, and a PLC data logger (i) for communication with a selected number of sensors for receiving and recording data communicated from each of the sensors, (ii) for communication with the charge controller, the array of solar PV panels, the irrigation pump, and the battery, (iii) for secured wireless transmission of recorded data via the cloud to a remote server whereby an operator is able to receive and process the wireless transmitted recorded data, and (iv) for receiving wireless data from the remote operator for changing and controlling the operating parameters for the irrigation pump, the charge controller and each of the sensors.

According to an aspect, the example system may additionally comprise a water-tight and leak-proof container for housing and installing therein the irrigation pump controller, the battery and battery controller, and the PLC data logger. According to another aspect, the lid for the container may be configured for demountable engagement thereonto or therewith of one or more arrays of solar PV panels.

According to another embodiment of the present disclosure, an example kit of parts for assembly and configuration into a system for providing autonomous solar-powered, self-monitoring, and self-controlling irrigation to plants growing on selected sites, may comprise an array of solar PV panels, a charge controller for communication with the array of solar PV panels, an irrigation pump, a pump controller for communication with the irrigation pump, a battery, a battery controller, and a data logger (i) for communication with a selected number of sensors for receiving and recording data communicated from each of the sensors, (ii) for communication with the charge controller, the array of solar PV panels, the irrigation pump, and the battery, (iii)

for secured wireless transmission of recorded data via the cloud to a remote server whereby an operator is able to receive and process the wireless transmitted recorded data, and (iv) for receiving wireless data from the remote operator for changing and controlling the operating parameters for the irrigation pump, the charge controller and each of the sensors.

BRIEF DESCRIPTION OF THE DRAWINGS

The embodiments of the present disclosure will be described in reference to the following drawings, in which:

FIG. 4 show a side view of a submersible pump component of the system shown in FIGS. 1 and 2 (FIG. 4A), the submersible pump with a protective screening housing encasing the pump and engaged with an anchor (FIG. 4B), and the controller for the pump, previously shown installed into the container in FIG. 3 (FIG. 4C);

FIG. 9 is a perspective front view of another example system disclosed herein (FIG. 9A), and FIG. 9B is a perspective side view of the system illustrated in FIG. 9A.

DETAILED DESCRIPTION

Figure 1:
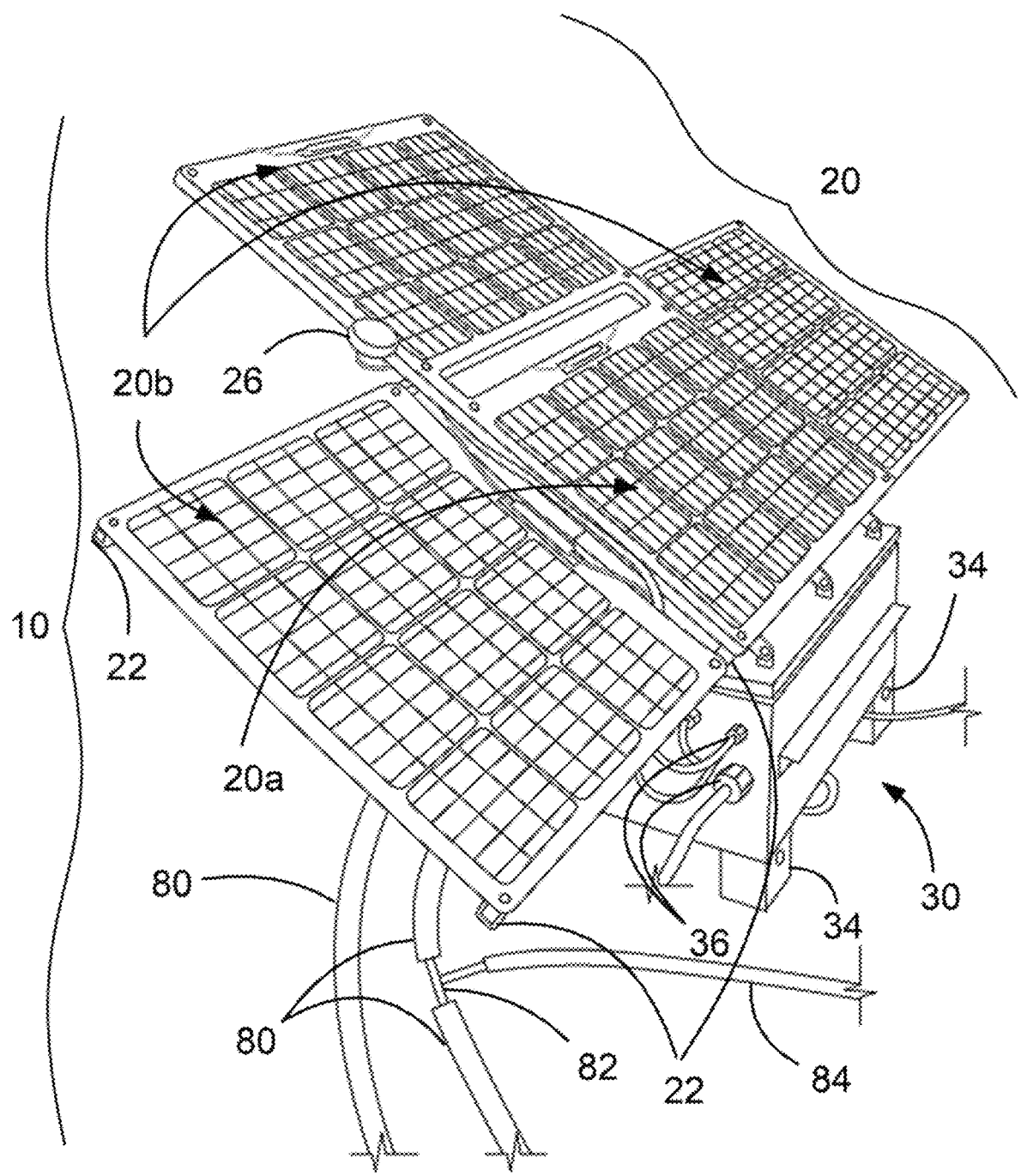
FIG. 1 is a perspective view of an example system according to an embodiment of this disclosure.

The embodiments of the present disclosure generally relate to portable and easily transportable autonomous solar-powered irrigation systems that can be installed into a number of different open-air environments wherein there is a need for supplemental controlled irrigation of newly transplanted plant materials to facilitate their early root growth and establishment in the site soil structure after transplanting and then to enhance initiation and growth of their stems and leaves during the rest of a spring-summer-fall growing season.

A suitable use of the autonomous solar-powered irrigation systems disclosed herein is in wetland sites adjacent to waterways wherefrom the present systems may draw irrigation water for controllable delivery across the installation sites. Particularly suitable wetland sites for use with the present systems are phytoremediation sites for restoration from chemical and or hydrocarbon toxicity.

Another particularly suitable use of the autonomous solar-powered irrigation systems disclosed herein is in municipal and regional parkland and recreational sites adjacent to waterways and or water-holding ponds and reservoirs wherefrom the present systems may draw irrigation water for controllable delivery across the installation sites.

Another particularly suitable use of the autonomous solar-powered irrigation systems disclosed herein is in dryland sites that are not near to waterways or water reservoirs, but are provided with refillable water tanks wherefrom the present systems may draw irrigation water for controllable delivery across the installation sites.

After installation on a site is complete, the autonomous solar-powered irrigation system will function autonomously to provide on-demand irrigation to the transplanted plants in response to environmental conditions without the need for onsite personnel to turn the irrigation equipment on and off, and/or to manually adjust the duration of a watering event and the volumes of irrigation water delivered during a watering event.

Some embodiments of the present disclosure relate to autonomous solar-powered, self-monitoring, and self-controlling irrigation systems configured for providing supplemental watering for plants growing on selected sites, without the need for supplemental power from power grids or from onsite combustion-driven generators.

An example embodiment of the systems disclosed herein may comprise (A) one or more arrays of solar photovoltaic panels (also referred to herein as solar PV panels), (B) a charge controller in communication with the array of solar PV panels, (C) an irrigation pump in communication with a pump controller (Ci), (D) a drip irrigation distribution network in communication with the irrigation pump, (E) one or more batteries in communication with the charge controller, the array of solar PV panels, and the irrigation pump, and a programmable logic controller (PLC) data logger (F) for communication with a selected number of sensors (Fi) for receiving and recording data communicated from each of the sensors, (Fii) for communication with the charge controller, the array of solar PV panels, the irrigation pump, and the battery, (Fiii) for secured wireless transmission of recorded data via the cloud to a remote server in communication with a microprocessor whereby an operator is able to receive and process the transmitted recorded data, and (Fiv) for receiving wireless communication from the operator for changing and controlling the operating parameters for the irrigation pump, the charge controller and each of the sensors. According to an aspect, sensors in communication with the data controller may include light intensity sensors, soil moisture sensors, soil temperature sensors, ambient temperature sensors, ambient humidity sensors, water tank float sensors, and the like.

According to an aspect, electricity generated by the solar PV arrays during daylight hours is stored in the one or more batteries that may also be referred to herein as a "battery bank". According to another aspect, the charger controller is configured to manage the flow of electricity generated by the solar PV arrays into the battery bank so that the one or more batteries are not overcharged, and so that power does not flow from the battery bank to the solar PV arrays overnight or when there is insufficient daylight illumination for the solar PV arrays to generate electricity.

According to an aspect, the autonomous solar-powered irrigation systems may be configured for autonomous control of operation of the irrigation pump to provide sufficient irrigation watering to an onsite-installed drip irrigation distribution network, in response to changes in the intensity of daylight illumination (also referred to herein as "solar radiation"), and optionally, fluctuations in soil moisture and temperature. According to a further aspect, the autonomous solar-powered irrigation systems may be additionally configured for modulation of the system-delivered irrigation watering in response to wireless communications received by the data controller from a remote operator via the cloud.

Those skilled in the arts of wetland and dryland ecological management know that, regardless of whether the sites are located in remote areas or in readily accessible regions, a common feature shared by the sites share is rapid and significant weather fluctuations during the early spring months when propagated perennial, woody shrubs, and juvenile tree planting materials are transplanted into the sites and then, during the establishment and growth of the transplanted material. For example, most phytoremediation wetland sites are three-year projects wherein the first year is the transplanting of propagated indigenous plant material into the sites followed by the established of their root systems into the wetland soil structures and initial vegetative growth. The second year of the phytoremediation projects is generally characterized by further root growth and development by the transplanted indigenous plant material accompanied by vigorous vegetative growth, and it is during the second growing season that that the transplanted indigenous plant material begin absorbing and sequestering heavy metals, hydrocarbons, and other pollutants from the wetland soils. Transplanted indigenous plant material that have established, survived, and thrived on phytoremediated wetland sites during the first two growing seasons, have become adapted to the seasonal environmental fluctuations and under ideal conditions, will continue to increase their absorption and sequestering of heavy metals, hydrocarbons, and other pollutants from the wetland soils during the third year of the phytoremediation projects.

Those skilled in the arts of wetland and dryland ecological management know that it is important for transplanted plant materials receive high-frequency, short-duration, shallow watering during the first three weeks after planting to facilitate initial root growth and development. After the initial three-week post-transplanting period has passed, it is then important for irrigation objectives to focus through to the end of August in most temperate climate zones, on facilitating the development of healthy root development by application of medium-frequency irrigation, that is one time per day, with moderate duration and volumes to cause the roots to grow deeper into the wetland soil structure. The main goal is to recharge the soil moisture as needed without overwatering/saturation of the wetland soil structures. It is to be noted that overwatering during the summer months will result in development of shallow root systems only that will result in plant drought stresses and death during the fall months. Then, during the onset of the fall months, for example during the month of September, the irrigation objective is to "harden off" the transplanted indigenous plant stock by enhancing their roots to grow deeply into the wetland soil structure, by low-frequency but long-duration watering no more than once per week. Typically, supplemental irrigation on phytoremediation wetland sites is stopped at the end of September.

Those skilled in the arts of wetland and dryland ecological management commonly rely on several well-known approaches for determining irrigation water volume requirements for transplanted plants growing in wetland or dryland soils. These include visual observation and decision-making based on prior experience, infrared thermometry, soil moisture measurement (probes), and evapotranspiration (ET) computational models. The term evapotranspiration (ET) is commonly used to describe two processes of water loss from land surface to atmosphere, evaporation and transpiration. The crop specific irrigation requirement $ET_C$ is calculated by multiplication of two variables, the reference evapotranspiration $ET_O$ and the crop coefficient $K_C$. Reference $ET_O$ is a baseline value calculated based on climatic data including temperature, humidity, wind speed, and solar radiation. The baseline $ET_O$ value represents the combined amount of water used by a reference crop and the amount of water lost from the soil through evaporation during a set time period. The crop coefficient $K_C$ is an adjustment factor. There are many factors that influence the crop coefficient, such as plant/tree species, soil salinity, stage of growth, nitrogen fertility rates, soil pH, among others. The problem with ET-based irrigation scheduling based on modeling of extensive data and assumption inputs, is its impracticability for concurrent monitoring and management of multiple wetland and/or dryland phytoremediation sites for the typical 3-stage growing seasons in temperate climates.

An underlying the key objective for operation of the example autonomous solar-powered irrigation systems disclosed herein is not to ensure highest crop yield or to minimize/optimize irrigation volumes, but rather, to ensure that transplanted indigenous plants are able to establish well-developed and vigorous root systems that will enable the transplanted plants to survive overwinter after the autonomous solar-powered irrigation systems have been removed and prior to their re-installation the following spring. It is to be noted that during the second and third spring-summer-fall growing season, the irrigation management strategy for use with the present autonomous solar-powered irrigation systems is medium-frequency irrigation, that is one time per day, during the spring through to the end of summer months, followed by a one-month hardening-off program with low-frequency but long-duration watering no more than once per week.

Those skilled in this art know that solar radiation is the single biggest factor impacting evapotranspiration and subsequently irrigation volume requirements. Accordingly, an embodiment of this disclosure pertains to a computerized method for processing solar radiation data and data reporting the amounts of solar energy thereby produced, received and communicated by the PLC data logger to the microprocessor whereby instructions are generated and communicated to the PLC data logger for modulating the irrigation timing and volumes during the three different stages of transplanted indigenous plants establishment and growth during the first year on a wetland or a dryland site.

An example embodiment of a suitable computerized method for modulating and controlling irrigation timing and volumes by an example autonomous solar-powered irrigation system according to the present disclosure installed into a phytoremediation wetland site, during the first three-week establishment phase after transplanting, follows. In reference to historical data recorded in previous years for the first three-week establishment phase on other phytoremediation wetland sites, it is known that:

the average daily irrigation volume required is about 2.1 l/(m2·day) which is equivalent to about 2.1 mm.
  the irrigation system is set to commence the first irrigation event at 8:00 am.
  on an average day during the three-week establishment period, the solar radiation generated a total Wh generated per W solar of 3.75 Wh/W.

Based on the known historical averages, the size of the power system (solar PV panels and battery capacity) used previously, and the irrigation volumes applied in previous years, the following parameters may be calculated and wirelessly communicated to data logger:

daily irrigation start and stop times, for example; first irrigation to start at 8 am and the last irrigation to stop by 4 pm.

an average number of daily irrigation cycles during the first three-week stage, for example; four irrigation cycles/day with 20-min irrigation/cycle set at 8:00 am, 10:45 am, 1:00 pm, and 3:15 pm to provide sufficient later afternoon—early evening solar radiation to recharge the battery pack to at least 95% capacity.

the average battery drawdown per irrigation cycle will be about 25%-40%.

The battery bank will be partially or fully recharged by electricity generated by the solar PV arrays between and during the irrigation cycles (relative to the intensity of solar radiation throughout the day).

During days during the initial three-week establishment phase wherein the solar radiation exceeds the historical average daily solar radiation, both the irrigation cycle frequency and durations of irrigation will be increased by the computerized method in response to increases in the magnitude of the solar radiation data communicated by the light intensity sensors to the PLC data logger and then through the cloud to the remote server and microprocessor wherein the computerized method will process the increased solar radiation data and thereby determine suitable increases in irrigation frequencies and volumes that will be wirelessly communicated back to the PLC data logger and then to the irrigation pump and irrigation pump controller. Under conditions of increased intensity of solar radiation, the solar PV panels will generate more electricity to more quickly recharge the battery pack to facilitate increased power capacity for the increasing frequencies of irrigation and irrigation volumes.

During cloudy days during the initial three-week post-transplant establishment phase wherein the solar radiation is substantially below the historical average daily solar radiation, both the irrigation cycle frequency and durations of irrigation will be decreased by the computerized method in response to decreases in the magnitude of the solar radiation data communicated by the light intensity sensors to the PLC data logger and then through the cloud to the remote server and microprocessor wherein the computerized method will process the decreased solar radiation data and thereby determine suitable increases in irrigation frequencies and volumes that will be wirelessly communicated back to the PLC data logger and then to the irrigation pump and irrigation pump controller. Under conditions of decreased intensity of solar radiation, the solar PV panels will generate less electricity to more slowly recharge the battery pack which is mitigated by the reduced frequencies of irrigation and irrigation volumes.

According to an aspect, the computerized method may additionally comprise steps of compiling daily sensor data received from the PLC data logger into daily summary reports that the operator may download on an on-demand basis and/or regular daily basis. The daily summary reports may comprise a daily summary of solar radiation intensity over a twelve-hour period for example, from 7 am to 7 pm; a daily average of soil temperature and optionally, a summary of soil temperature fluctuations over the twelve-hour period; a daily average of soil moisture levels and optionally, a summary of soil moisture level fluctuations over the twelve-hour period; a daily summary of temperature fluctuations over a twelve-hour period. As the day lengths increase during the spring months toward the summer equinox, the computerized method may additionally increase the daily duration of monitoring the communicated sensor data to thirteen-hour periods, to fourteen-hour periods, to 15-hour periods, to sixteen-hour periods during the week of the summer equinox, and then to regularly decrease the daily duration of monitoring the communicated sensor data through to the end of September.

After the initial three-week establishment phase after transplanting has been completed, usually during the month of May, the computerized program may communicate a different irrigation cycle and irrigation volume for the second phase wherein the focus is on facilitating healthy root growth and development accompanied by vegetative growth. The second phase may be programmed to provide an extended period of irrigation once daily, for example at 8 am for 60 min. Based on sensor data communicated to the PLC data logger and then through the cloud to the remote server and microprocessor, the computerized method may communicate a longer duration of irrigation during very sunny days and alternatively, a shorter duration of irrigation during cloudy days. It should be noted that while the irrigation frequency is reduced to once every morning during the second phase of transplanted plant growth and development, the sensors and data logger may continue to communicate solar radiation data, soil moisture data, soil temperature data, ambient air temperature data, ambient humidity data, and the like to the microprocessor whereby the computerized method will continue to produce and provide on-demand and/or regularly scheduled summary data, to thereby enable an operator to monitor the phytoremediation wetland sites remotely without having to be onsite. If so desired in response to data provided in the summary reports, the operator may communicate over the cloud directly with the PLC data logger for manually changing irrigation pump operation and control.

An example embodiment of an autonomous solar-powered irrigation system according to the present disclosure, is illustrated in FIGS. 1-5 and generally comprises an array 20 of four solar PV panels 20a, 20b, 20c, 20d, wherein solar PV panel 20a is hingedly engaged with the top, also referred to herein as a "lid" of a portable, transportable, water-tight, and water-proof container 30 wherein are mounted a number of system components, and shown engaged with a drip irrigation main line 80 and a irrigation dripper line 82 (FIGS. 1,2) that are interconnected with drip irrigation distribution network (not illustrated) that may be laid down and across an irrigated wetland or dryland site.

Figure 2:
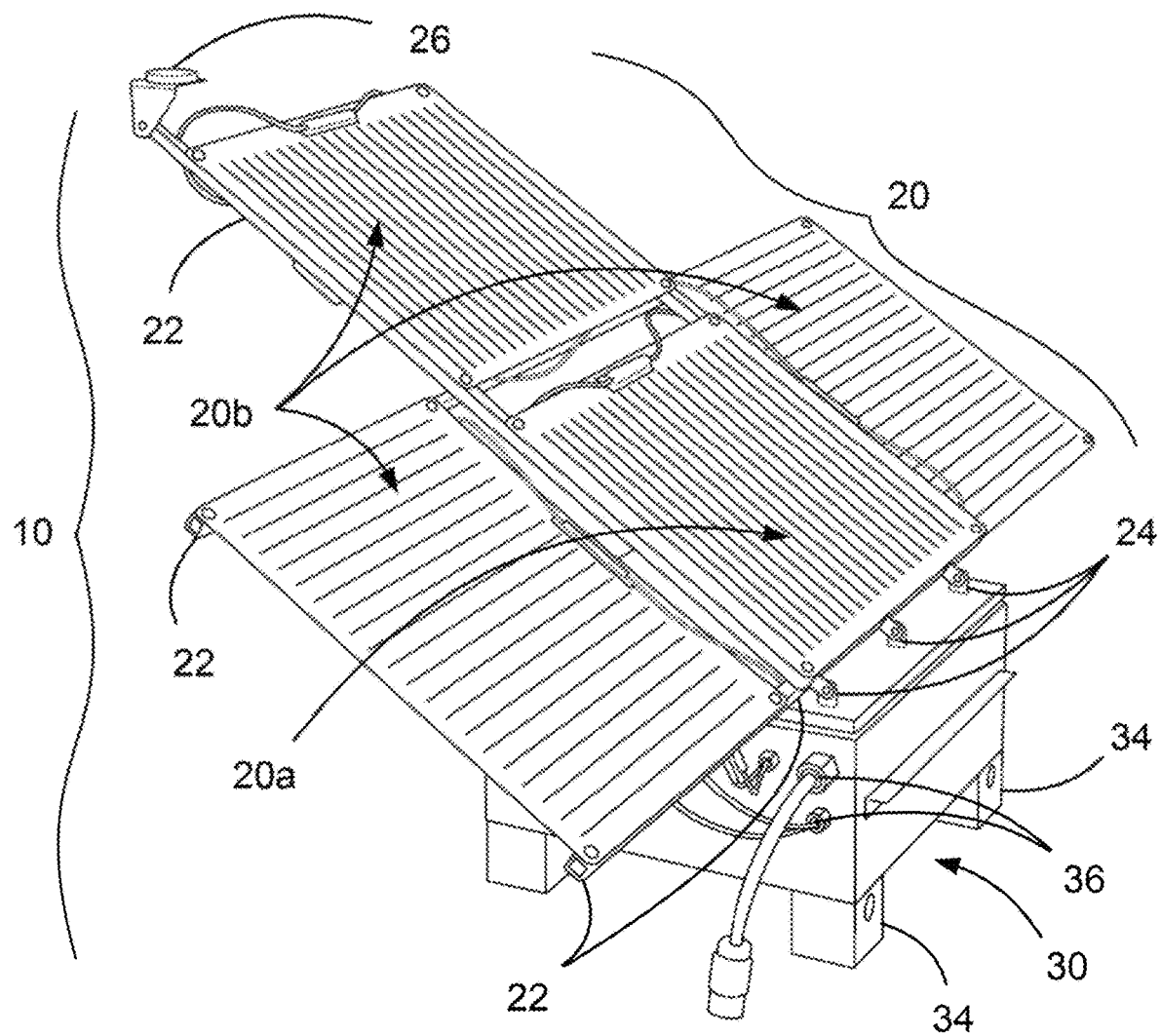
FIG. 2 is another perspective view of the system shown in FIG. 1.

In this example, the array 20 comprises four solar PV panels 20a, 20b, 20c, 20d, wherein the bottom end of a first solar PV panel 20a is hingedly engaged with the top of container 30 with hinges 24 (FIGS. 1, 2). The bottom ends of solar PV panels 20b, 20a, 20c are engaged with a first mounting rail 22, while the top ends of solar PV panels 20b, 20a, 20c and the bottom end of the solar PV panel 20d are each engaged with a second mounting rail 22 (FIGS. 1, 2). This arrangement of the solar PV panel array 20 allows the solar PV panel array 20 to be folded flatly against the top of the container 30 for transport and storage. It is optional if so desired, to provide a plurality of hinges engaged with the side ends of solar PV panels 20b, 20a, 20c, the top end of solar PV panel 20a, and the bottom end of solar PV panel 20d whereby the side ends of solar PV panels 20b-20a and 20a-20c may be hingedly engaged, and the bottom end of solar PV panel 20d and the top end of solar panel 20a may be hingedly engaged, to thereby allow the three solar PV panels 20b, 20c, 20d to be folded flatly against three sides of the container 30, for safe storage and transport. It is to be noted that the container 30 illustrated is provided with optional feet 34. However, suitable containers also include those with flat bottoms, that is, without feet 34. It is also noted that at least four anchoring cable hooks are provided for securing the bottom corners of the container 30 and/or or feet 32 into the surface of the wetland or dryland site. Suitable anchoring cable hooks are exemplified by SHELTERLOGIC® Easy Hook Anchors available from ShelterLogic Corp. and their consumer retail distributors, and the like (SHELTERLOGIC is a registered trademark of ShelterLogic Corp., Watertown, CN, USA)

Figure 3:
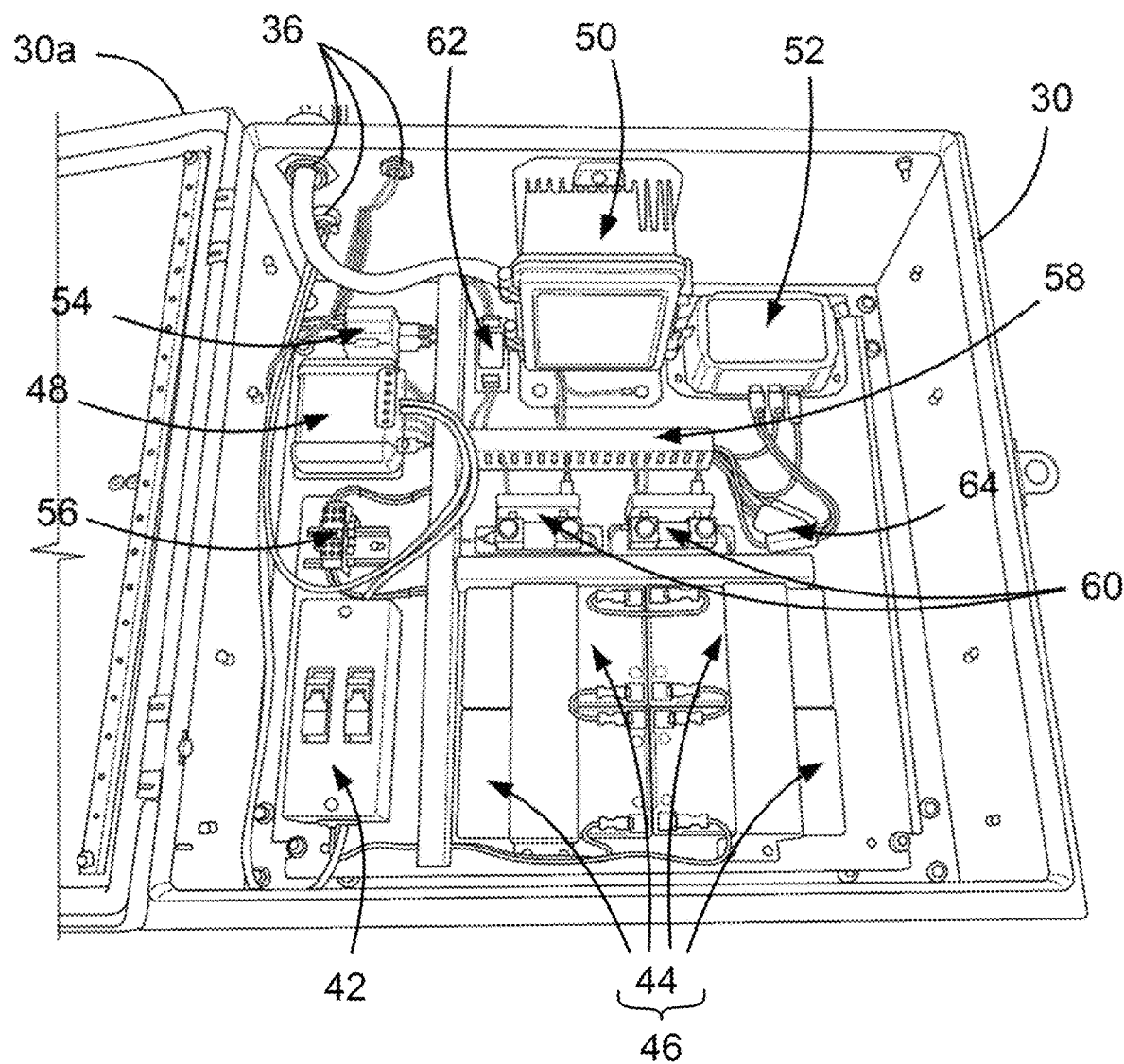
FIG. 3 is a top view of the inside of a water-tight container housing some components of the system shown in FIGS. 1 and 2.
Figure 5:
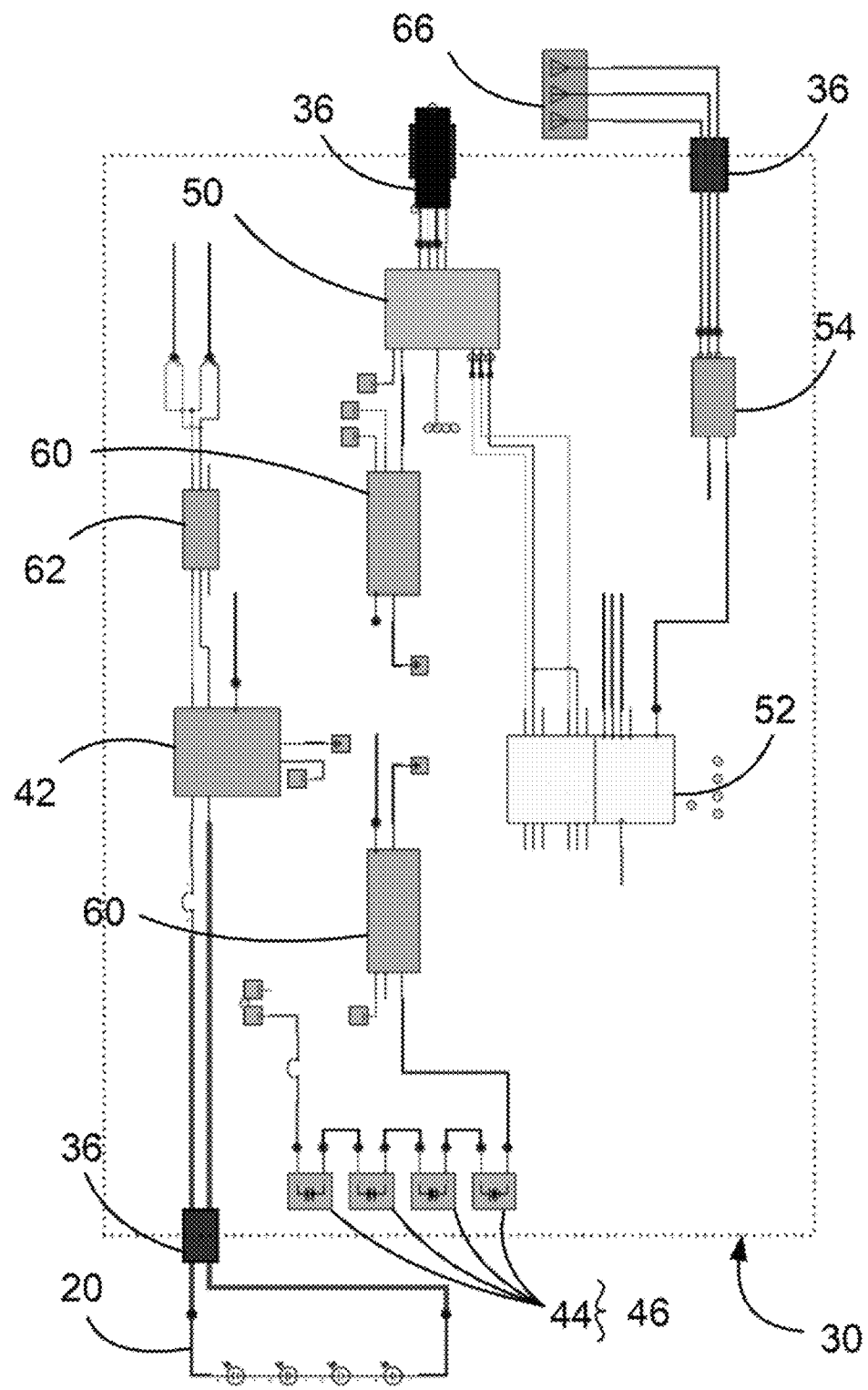
FIG. 5 is a schematic illustration of an example wiring diagram interconnecting the components of the example system shown in FIG. 3.

Mounted inside the container 30 are a Victron MPPT charge controller 48 (MPPT means "maximum power point tracking"), a battery pack 46 which in this example comprises two batteries 44, a switchboard 42 with manual on/off switches for the solar PV panel array 22 and the battery pack 46, a pump controller 50 for a submersible pump 60, and a PLC data logger 52 (FIGS. 3, 4, 5). In this particular example, the PLC data logger 52 is a CR1000X data logger available from Campbell Scientific Canada (Edmonton, CB, CA). Also provided and in communication with the PLC data logger 52 is a RASPBERRY PI® microprocessor (RASPBERRY PI is a registered trademark of Raspberry PI Ltd. PLC, Cambridge, UK).

Also mounted inside the container 30 is a modem 54 equipped with a LTE SIM card and configured for wireless communication with external GPS signals and LTE antenna 66 (LTE means "Long Term Evolution" technology), and a pair of SMARTSHUNT® battery monitors 60 (SMARTSHUNT is a registered trademark of Victron Energy B.V. Netherlands, Almere, The Netherlands) that are connected to the PLC data logger 52 for wireless transmission therewith of data pertaining to battery parameters including state-of-charge, battery charge remaining, time-to-charge, and the like. It is to be noted that the container 30 is provided with compressible/expandable cable glands fitted within each of the portholes 36 provided in the sidewalls of the container 30 for ingress/egress of instrument, power, and sensor cables therethrough.

The pump controller 50 and submersible pump 60 shown in FIGS. 3, 4A, 4C are a SunPumps™ PCA controller for a brushless, sensorless, 3-phase DC, submersible SunPumps™ SCS series pump available from SunPumps Inc., Safford, AZ, USA and their distributors. In this example, the submersible pump 50 is shown sealed inside of a flexible housing screen 72 to prevent underwater particulate debris in waterways adjacent to wetlands whereonto the example system is installed, from entering into and potentially clogging and blocking the pump's operation (FIG. 4B). An endcap of the screen housing 75 is engaged with an anchor 64 to keep the submersible pump 60 stationary about the bottom of a waterway into which it has been employed. Also shown in FIG. 4C are an electric cable 68 in communication with the submersible pump 60 and the pump controller 50, and a flexible pipe 68 in communication with the submersible pump 60 and a drip irrigation distribution network (not illustrated).

Those skilled in these arts will know that there are at least five types of electric pump motors that could be used with the autonomous solar-powered irrigation systems disclosed herein including: (i) on-land screw pump motors, (ii) on-land centrifugal pump motors, (iii) submersible multistage pump motors, (iv) on-land gear pump motors, and (v) submersible axial piston pump motors. It is also to be noted that the autonomous solar-powered irrigation systems disclosed herein may be configured with submersible water pumps and non-submersible water pumps.

An example of a calculation to determine a daily requirement for electrical power production by a solar PC panel array disclosed herein, may be based for example, on an assumption that a submersible water pump selected for use in the systems disclosed herein, may have a target maximum capacity to produce a water flow rate of about 4,000 LPH (litres/h) under about 620 KPa (kilopascals), in other words, about 1,156 GPH (gallons/h) under about 90 PSI (pound/square inch). A suitable equation to calculate a target hydraulic power required to pump 4,000 LPH under about 620 KPa KPA pressure is shown in equation (1):

$$P_{h(kW)} = q\rho g h / (3.6\ 10^6) \tag{Eq 1}$$

where:
$P_{h(kW)}$=hydraulic power (kW) q=flow (m³/h)
ρ=density (kg/m³)
g=acceleration of gravity (9.81 m/s²)
h=differential head (m) (in this case, 90 PSI=207 ft+20 ft=227 ft or 69 m)
Accordingly:
$P_{h(kW)}$=4*1000*9.81*69/(3.6 10⁶)=0.7521 kW or roughly 1 HP
where:
Shaft Power $P_{s(kW)}=P_{h(kW)}/\eta p$ where ηp=pump efficiency
Required Motor Power=Shaft power/η where η=motor efficiency For reference purposes, the average electrical power required by different types of submersible pumps, to pump about 4,000 LPH at about 620 KPa is shown in Table 1.

In the example above with a target maximum capacity to produce a water flow rate of about 4,000 LPH with about 620 KPa of pressure, a solar PV-powered axial piston pump with an overall efficiency of about 0.58 would require about 1.3 kW to pump about 4,000 LPH with about 620 KPa of pressure with a 20 ft suction lift. Those skilled in this art will be able to adapt the above equations and assumptions to determine required power requirements for pumping submersible electric motors for lower target flow rates, pressures, and suction lifts for different types of wetland site use, to enable selection of suitable submersible motors and solar PC panels and panel arrays.

TABLE 1

| Pump Type | Typical pump efficiencies * | Typical DC motor efficiency | Overall efficiency | Required Motor power for pumping 4000 LPH at 620 KPa, 0.7521 kW/η |
|---|---|---|---|---|
| Screw pump | 70% | 65% | .46 | 1.65 kW |
| Centrifugal pump | 75% | 65% | .49 | 1.54 kW |
| Submersible multistage pump | 80% | 65% | .52 | 1.45 kW |
| Gear pump | 85% | 65% | .55 | 1.36 kW |
| Axial piston pump | 90% | 65% | .58 | 1.28 kW |

* rated

The solar PV panels 22 illustrated in this example were flexible 60 W PV ESUN60S-36FL modules available from CBI Solar, Red Deer, AB, CA, and measuring about 575 mm×680 mm×4 mm (22½ inches×26¾ inches×⅛ inches). Those skilled in this art will know that the solar PV array 20 shown in this example with four 60 W solar PV will produce on average about 240 W of electricity during a 10 h to 12 hr day. However, those skilled in this art know that there are 4 major types of solar panels available on the market today, that is monocrystalline PV panels, polycrystalline PV panels, passive emitter and rear cell panels commonly referred to as "PERC" PV panels, and thin-film PV panels. Accordingly, it is within the scope of this disclosure to select one or more rectangular solar PV panel from any one of these four types of solar PV panels having a maximum Power-Pmax rating of 60 W or 100 W, for the solar PV panel arrays 20 disclosed herein.

It should be noted that the number of solar PV panels selected to configure a solar PV panel array, should have the capacity to generate sufficient energy during a 10 h to 12 h, to sufficiently power a submersible water pump to provide four to six irrigation cycles of 20 min/cycle of delivering irrigation volumes to drippers spaced out along a drip irrigation distribution network during the first three-week establishment phase after nursery-produced planting material is transplanted into a wetland site. If it is determined that more than 240 W of electricity will be required to power a selected pump motor, then a skilled person might optionally (i) select and configure more than four 60 W solar PV panels, for example, five or six or seven or more 60 W solar PV panels, or alternatively (ii) select a plurality of 100 W solar PV panels in place of a plurality of 60 W solar PV panels for example four or five or six or seven or more 100 W solar PV panels.

It should be noted that any type of deep-cycle battery may be used for configuring suitable battery packs disclosed herein. For example, the most commonly available suitable deep-cycle batteries include (i) lead acid batteries such as flooded lead acid batteries, absorbent-glass-mat batteries commonly referred to as AGM batteries, gel-sealed lead acid batteries, and the like, (ii) lithium ion batteries, and (iii) nickel-based batteries.

Suitable solar battery controllers that may be used with the autonomous solar-powered irrigation systems disclosed herein, include among others (i) SMARTSOLAR MPPT RS® solar controllers (SMARTSOLAR MPPT RS is a registered trademark of Victron Energy B.V. Netherlands), (ii) AMPINVT AP Series MPPT solar charge controllers available from Foshan Top One Power Technology Co. Ltd. (Foshan City, Guangdong Province, China) and their distributors, (ii) Rover MPPT charge controllers available from Renogy (RNG Group Inc., Ontario, CA, USA), (iii) EPEVER MPPT solar charge controllers available from Beijing Epsolar Technology Inc. Co. (Changping District, Beijing, China) and their distributors, and the like.

Suitable solar-powered submersible DC brushless water pumps and pump controllers for the autonomous solar-powered irrigation systems disclosed herein, include (i) SCS- and SDS-series submersible pumps and pump controllers available from SunPumps Inc. (Stafford, AZ, USA) and their distributors, (ii) Solinst® submersible pumps and pump controllers available from Solinst Canada Ltd. (Georgetown, ON, CA) and their distributors, (iii) SWP™-series submersible pumps and pump controllers available from Aquatec International Inc. (Irvine, CA, USA) and their distributors, (iv) Sunrotor® SR-series submersible pumps and pump controllers available from Solar Power & Pump Co. (Elk City, OK, USA) and their distributors, and the like. It is to be noted that that electric non-submersible water pumps intended for use in agriculture and horticulture, can also be incorporated into the autonomous solar-powered irrigation systems disclosed herein. Examples of suitable non-submersible water pumps include EVERBILT® ½ HP shallow well jet pumps available from Home Depot (EVERBILT is a registered trademark of Home Depot Product Authority, Atlanta, GA, USA), Turf Boss electric irrigation pumps (1 HP, 1.5 HP, 2 HP) available from Franklin Electric (Toronto, ON, CA) and their distributors, Flotec™ shallow well pumps and booster pumps (½ HP, ¾ HP, 1 HO, 1½ HP) available from Water Pumps Direct (Bolingbrook, IL, USA), and the like.

Suitable data loggers for the autonomous solar-powered irrigation systems disclosed herein, include (i) CR1000X™ data loggers available from Campbell Scientific Inc. (Logan, UT, USA) and their distributors, (ii) MADGE TECH® wireless data loggers available from MadgeTech Inc. (Warner, NH, USA) and their distributors, (iii) INTELLISENSE® MWS-series data loggers available from Intellesense Systems Inc. (Torrance, CA, USA) and their distributors, and the like.

Figure 6:
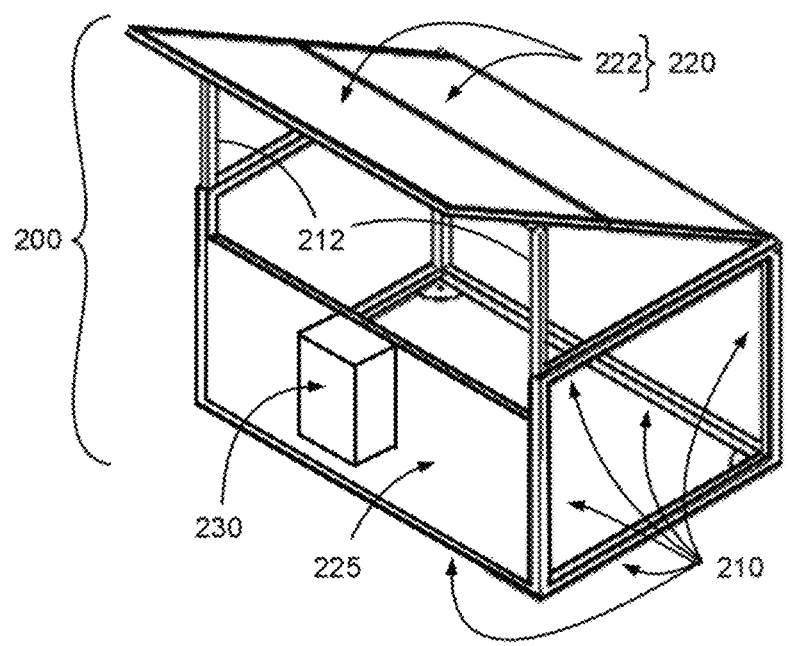
FIG. 6 shows views of another example system shown in an unfolded deployed operational configuration (FIG. 6A), and in a folded configuration for transport or storage (FIG. 6B)
Figure 6:
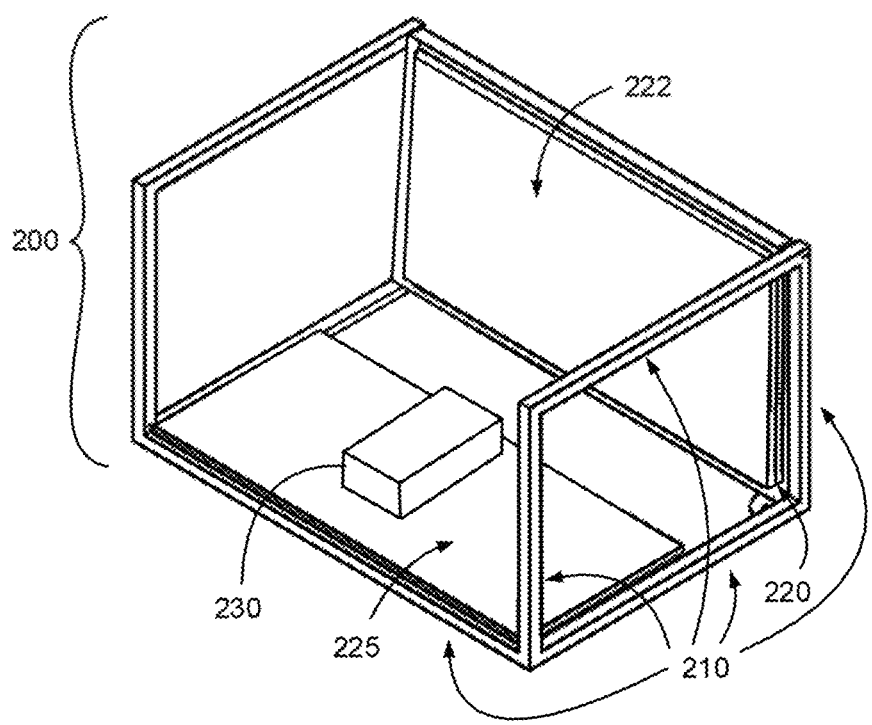

Another example embodiment of an autonomous solar-powered irrigation system 200 according to the present disclosure, is illustrated in FIGS. 6-9B and generally comprises a base framework 210 to which is hingedly engaged to one top side rail thereof, an array 220 of two solar PV panels 222 that are hingedly engaged such that the two solar PV panels 222 can be folded together and downward from the top rail of the base framework 210 for storage and transport as illustrated in FIG. 6B. A water-tight water-proof electronics container 230 is mounted onto the outward-facing surface of a rear side panel 225 that is hingedly attached to a rear side rail of the base framework 210, opposite to the front side rail to which is hingedly attached to the array 220 of solar PV panels 222. FIG. 6B shows the rear panel 225 folded inward and down for storage and transport. FIG. 6A shows the solar-powered irrigation system 200 in an operational configuration wherein the rear panel 225 has been hingedly unfolded and locked in place, and the array 220 of solar PV panels 222 has been hingedly unfolded with the opposite corners of the outward-facing array 220 supported by support arms 212. When installed on a wetland or dryland irrigation site, it is important to anchor the bottom corners of the base framework 210 into the soil with at least four anchoring cable hooks, for example, SHELTERLOGIC® Easy Hook Anchors available from ShelterLogic Corp. and their consumer retail distributors.

Figure 7:
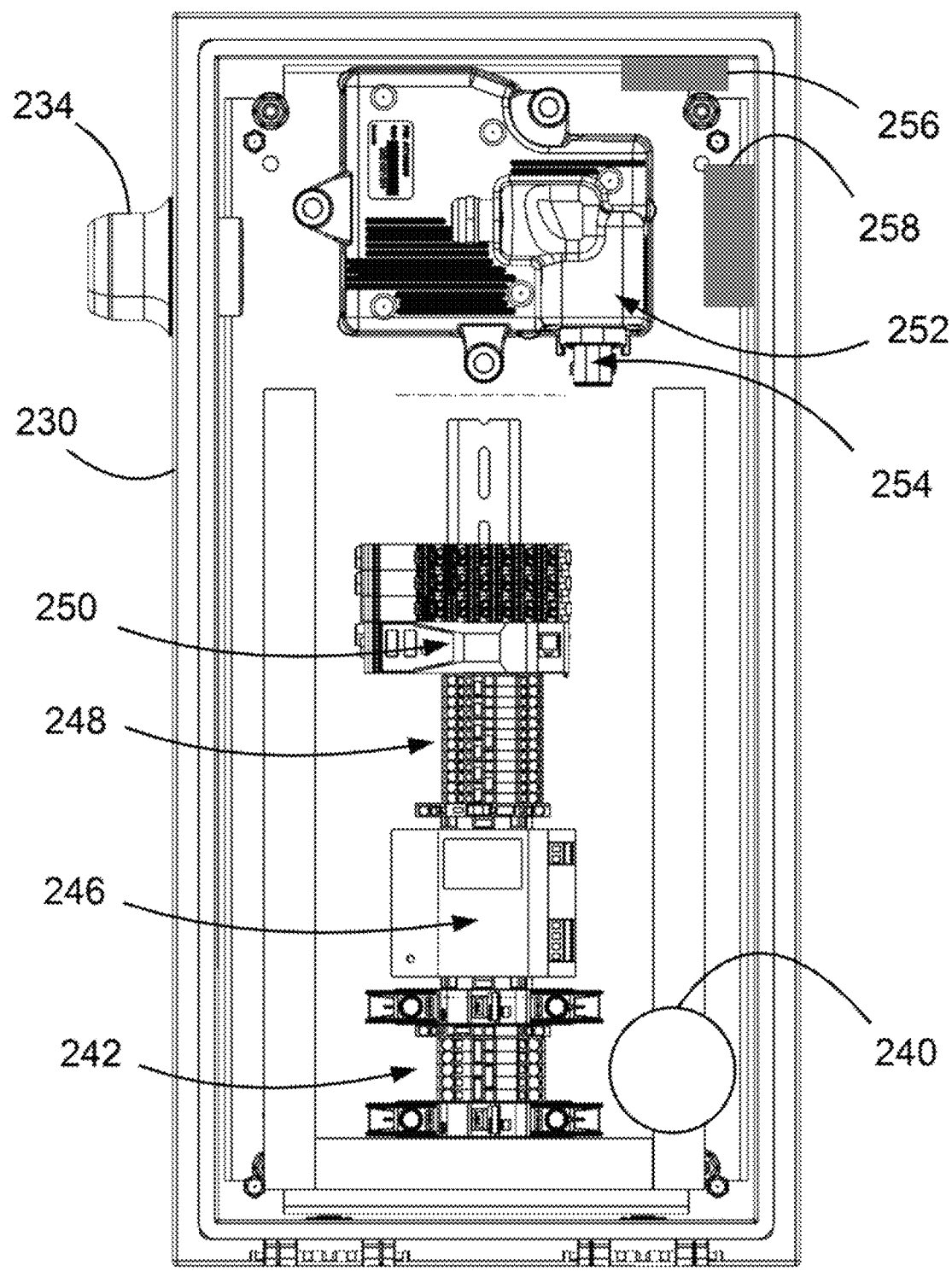
FIG. 7 is a top view of the inside of a water-tight container housing some components of the system shown in FIG. 6.
Figure 8A:
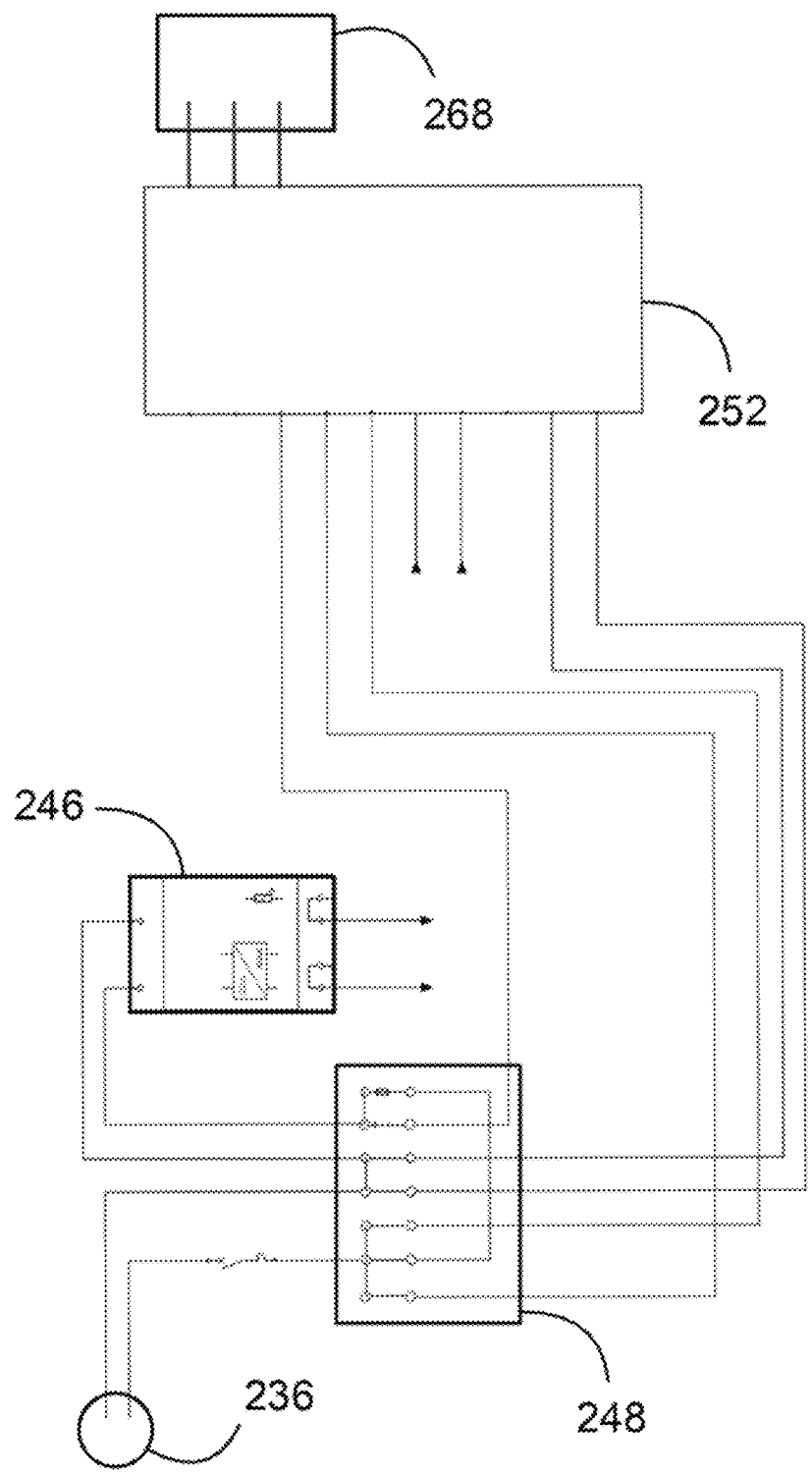
FIG. 8A is a schematic illustration of an example wiring diagram interconnecting some of the components of the example system shown in FIG. 7.
Figure 8B:
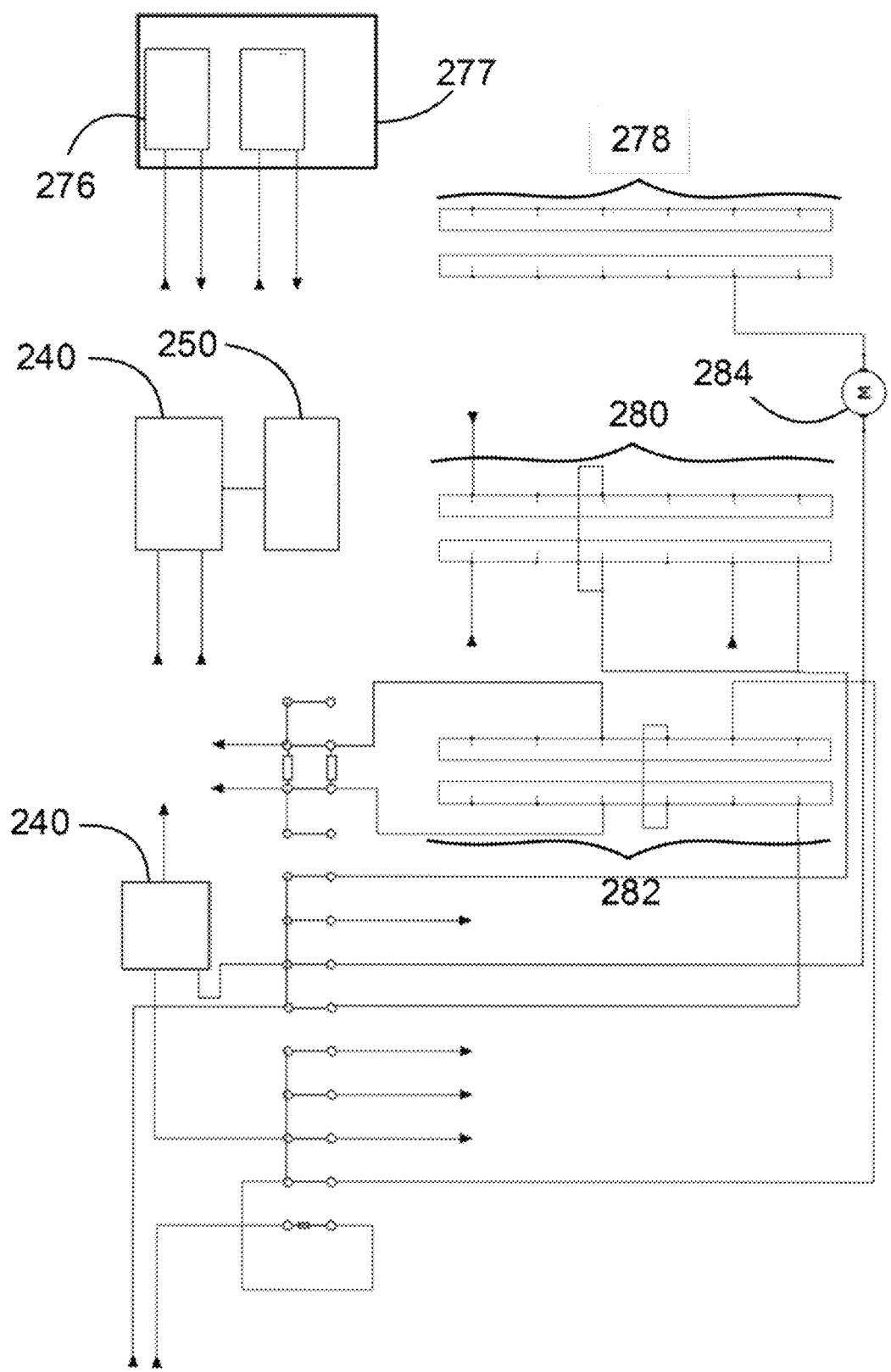
FIG. 8B is a schematic illustration of another example wiring diagram interconnecting some other components of the example system shown in FIG. 7.

The component contents of container 230 are illustrated in FIG. 7 (components only without wiring), 8A and 8B (wiring schematic drawings). The components include (i) an ANYBUS® wireless GPS/LTE bolt antenna (ANYBUS is a registered trademark of HMS Industrial Networks AB, Halmstad, Sweden) configured for wireless communication within Industrial Information and Communication Technology (Industrial ICT), (ii) a circuit breaker 242, (iii) a DC to DC converter 246 for converting electricity generated by the solar PV panels into 24V DC power that is storable in batteries and used for powering the irrigation pumps, (iv) a terminal block 248, (v) a PLC data logger 250, for example a X20C Compact-S CPU available from B&R Industrial Automation (Mississauga, ON, CA), and (vi) a BCDC irrigation pump motor controller 252 to provide 3-phase power 268 to a BLDC irrigation pump (not illustrated; www.bidcpump.com). Also included in the electronics container 230 (but not shown in FIG. 7) are an internal temperature sensor 270, a flow sensor 276, a pressure sensor 277, a X20 digital mixed module 278 (available from B&R Industrial Automation) for communication with the PLC data logger 250, a cooling fan 284, and X20 analog input modules 280, 282 (available from B&R Industrial Automation) for receiving communications from multiple sensors such as, for example, light intensity sensors, soil moisture sensors, soil temperature sensors, ambient temperature sensors, ambient humidity sensors, water tank float sensors, and the like. It is to be noted that, although not illustrated, it is suitable to incorporate into the container 230, a microprocessor such as a RASPBERRY PI® microprocessor.

Another example embodiment of an autonomous solar-powered irrigation system 300 according to the present disclosure, is illustrated in FIGS. 9A, 9B and generally comprises a base framework 310 with its front-facing top rail provided with a yoke bracket 312 for hinged engagement therewith with a framework 314 onto which is mounted an array 320 of two solar PV panels 322. When the system 300 is not in use, the framework 314 is folded flat against the top of the base framework 310 for storage or transport. A yoke 317 with a plurality of pairs of bores 318 therethrough is provided on a downward-facing surface of a rail component of the framework 314. The rear-facing top rail of the base framework 314 is provided with a yoke 312 to which a support arm 316 is hingedly engaged. When deployed onto a wetland or dryland irrigation site, the top of the solar array 320 is raised, and the support arm 316 is demountably engaged with a selected pair of bores 318 in yoke 217 with a hinge pin. When the system 300 is installed into a wetland or dryland irrigation site, it is important to anchor the bottom corners of the base framework 310 into the soil with at least four anchoring cable hooks, for example, SHELTERLOGIC® Easy Hook Anchors available from ShelterLogic Corp. and their consumer retail distributors. The autonomous solar-powered irrigation system 300 illustrated in FIGS. 9A, 9B is provided with the water-tight water-proof electronics container 230 with the components previously disclosed herein.

Another embodiment according to the present disclosure, relates to kits of parts comprising components for assembly into various configurations of the portable, transportable autonomous solar-powered irrigation systems disclosed herein. An example kit of parts may comprise an array of one or more solar PV panels, one or more batteries for receiving, storing, and discharging electricity produced by the array of solar PV panels, one or more manual switches for turning the array of solar PV panels and the battery on and off, a charge controller for communication with the array of solar PV panels and the battery, a battery monitor, a water pump and pump controller, a data logger capable of wireless communication with the cloud, relays and switches for hard-wired interconnection of the aforementioned components, and a water-tight, water-proof container for housing therein the battery or batteries, one or more on/off manual switches, the battery monitor, the pump controller, the PLC data logger, the relays, and switches. According to an aspect, the water pump may be a submersible water pump. According to another aspect, the water pump may be a non-submersible water pump. According to an aspect, one of the solar PV panels may be hingedly engaged with the top of the water-proof and water-tight container.

According to an aspect, the kit of parts may additionally comprise one or more of a light intensity sensor, a soil moisture sensor, a soil temperature sensor, an ambient temperature sensor, an ambient humidity sensor, and a water tank float sensor.

According to another aspect, the kit of parts may additionally comprise a flexible screening housing for encasing the submersible water pump therein.

According to another aspect, the kit of parts may alternatively comprise in place of the battery, a battery pack comprising two or more batteries.

According to another aspect, the array of one or more solar PV panels may comprise a first solar PV panel and a plurality of second solar PV panels, wherein the first solar PV panel has (i) hinges provided along one side edge for hinged engagement with the top of the water-tight, water-proof container, (ii) hinges provided long its other three side edges for hinged engagement with hinges provided on side edges of one or two or three of the second solar PV panels.

According to another aspect, the kit of parts may additionally comprise a framework for hingedly engagement with the solar PV panel array. According to an aspect, the water-tight, water-proof container may be mounted onto or alternatively, into the framework.

According to another aspect, the kit of parts may additionally comprise a computer-implemented software program configured for wireless communication with the PLC data logger through the cloud. The computer-implemented software program may be configured to receive, store, process, summarize, and produce reports on an ongoing basis, regarding daily data received from the PLC data logger pertaining environment conditions from a site onto which an example autonomous solar-powered irrigation system disclosed herein, has been installed, for example regular time-period spaced-apart records during day-light hours of solar radiation intensity, battery charge status, battery usage for powering the submersible pump, volumes of irrigation water delivered during an irrigation cycle, pressures of irrigation volumes produced by the submersible pump, soil moisture, soil temperature, ambient air temperature, and ambient humidity. The computer-implemented software program may be configured to determine the changes occurring during a 24 h period in one or more of solar radiation intensity, battery charge status, battery usage for powering the submersible pump, soil moisture, soil temperature, ambient air temperature, and ambient humidity. The computer-implemented software program may be configured to set upper and lower limits for data received in one or more of solar radiation intensity, battery charge status, battery usage for powering the submersible pump, soil moisture, soil temperature, ambient air temperature, and ambient humidity, and if data received for one or more of the transmitted data is greater than or less than the upper and lower limits, to trigger a response command for wireless communication over the cloud to the PLC data logger to thereby cause an increase or decrease in (i) the duration of an irrigation cycle, (ii) the irrigation volume delivered during an irrigation cycle, (iv) the number of irrigation cycles delivered during a daylight time period, and/or alternatively to turn on or off one of more of the array of solar PV panels, the battery or battery pack, and the submersible water pump. The computer-implemented software program may be configured to produce summary reports for each of the recorded data, for example, for solar radiation intensity, battery charge status, battery usage for powering the submersible pump, volumes of irrigation water delivered during an irrigation cycle, pressures of irrigation volumes produced by the submersible pump, soil moisture, soil temperature, ambient air temperature, ambient humidity, on an hourly basis, daily basis, weekly basis, monthly basis, and growing season basis. The computer-implemented software program may be configured to send an alert over the cloud to an operator's portable computer device such as a cellphone, an IPAD® (IPAD is a registered trademark of Apple Inc., Cupertino, CA, USA), a table, a laptop computer, and the like, when data received from the PLC data logger data for one or more of the transmitted data, is greater than or less than the set upper and lower limits. The computer-implemented software program may be configured for access by an operator using a portable computer device, to review selected summary reports and or alerts, and to manually (i) change upper and lower limits for one or more parameters being monitored and communicated by the PLC data logger, and/or (ii) to turn off or on, one or more of the array of solar PV panels, the battery or battery pack, and the submersible water pump.

Although the present disclosure generally relates to systems and kits of parts comprising components for portable, transportable autonomous solar-powered irrigation systems, for installation and use in remote phytoremediation wetland sites, it is to be noted that the systems and kits of parts can also be used in wetlands adjacent to waterways flowing through urban and industrial areas.

Almost all municipal and regional parklands and recreational areas have wetlands associated with waterways flowing therethrough. Many of the municipal and regional parklands and recreational areas are provided with extensive irrigation systems controlled by timers figured to provide regularly scheduled irrigation cycles to maintain healthy and vigorous landscapes for users' enjoyment. A problem with such municipal and regional sites is that regularly scheduled irrigation cycles deliver irrigation volumes during periods of rain, commonly resulting in overwatering and saturation of the irrigated wetlands. Such unnecessary irrigation may cause serious plant stresses as well as wastage of water resources that may result in water shortage later during the growing season when ambient temperatures are at their annual highest, Accordingly the systems and kits of parts for systems for portable, transportable autonomous solar-powered irrigation systems disclosed herein, are also particularly suitable for installation in wetlands associated with municipal and regional parklands and recreational areas to replace regularly scheduled irrigation systems.

It is to be noted that the portable, transportable autonomous solar-powered irrigation systems disclosed herein, may also be installed on dryland sites that do not have access to naturally occurring waterways. In such dryland installations, it is suitable to provide one or more transportable plastic water tanks having water-level float sensors therein, for receiving, holding, and dispensing irrigation water therefrom with autonomous solar-powered irrigation systems disclosed herein. For example, a selected dryland irrigation site may be provided with three or more 10,000 L plastic water tanks. Other sites may be provided with two or more plastic 1,000 L to 20,000 L water tanks. Autonomous solar-powered irrigation systems disclosed herein and installed onto such dryland sites, the water tank float sensors will be in constant communication with the data loggers, and alerts may be programmed for communication to a monitoring system or an operator, when the irrigation water level in one or more water tanks falls below a pre-set tank volume so that fresh supply of irrigation water is transported to the sites for refilling the water tanks.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a–b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

NUMBER KEY 10 autonomous solar-powered irrigation system
20 array of solar PV panels
20a solar PV panel hingedly engaged with the top of container 30
20b solar PV panels
22 mounting rail
24 hinges for mounting solar PV panel 22a to the top of container 30
26 light intensity sensor/solar radiation sensor
30 water-tight water-proof electronics container
34 container feet
36 cable gland to maintain enclosure integrity with wires extending into/out of the container 30
42 manual on/off switch panel for the solar array and the battery pack 44 battery
46 battery pack
48 Victron charge controller—takes power form the solar panels and modules the current and voltage to charge the batteries most efficiently
50 SunPump™ DC pump controller—takes power from the batteries and converts it into three phase DC to run the SunPump pump. Also has a switch controlled by the raspberry pi to remotely switch the pump with logic or controls
52 PLC data logger with RASPBERRY PI® microprocessor—runs the logic and communicates with the cloud server via a LTE connection
54 Micro Hard Modem with LTE Sim Card installed for telecommunications—connects to external GPS and LTE antenna
56 Terminal Block
58 Wire Tray
60 Victron Smart Shunts—tracks the voltage and current (Power) going into (1st) and out of (2nd) from the batteries to estimate state of charge of the battery and power draw from the pump for safety setpoints and maintenance needs
62 DC to DC converter—takes power from MPPT charge controller and converts it to a power source for the raspberry pi and LTE/GPS modem
64 connect cables used to power and read data from the MPPT charge controller, and the two smart shunts—3 in total
66 antenna for GPS and LTE connectivity
70 submersible pump
72 flexible housing screen
74 anchor
75 housing end cap
76 electrical line in
78 piping from the submersible pump
80 drip irrigation main line
82 Tee fitting
84 irrigation dripper line
200 autonomous solar-powered irrigation system
210 base framework
212 support arms for solar PV panel array
220 hinged array of solar PV panels
222 solar PV panel
225 hinged back side panel
230 water-tight water-proof electronics container
234 cable gland
240 GPS/LTE antenna HMS ANYBUS Wireless Bolt LTE
242 circuit breaker
246 DC to DC converter
248 terminal block
250 PLC data logger (X20c Compact-S CPU—Programmable logic controller)
252 BLDC irrigation pump motor controller
268 3 phase power output
270 internal temperature sensor
276 flow sensor
277 pressure sensor
278 B&R X20 digital mixed module—output connectors to power modem and fan
280 B&R X20 analog input module—to read from sensors to CPU (250)
282 B&R X20 analog input module—to read from sensors to CPU (250)
284 cooling fan
300 autonomous solar-powered irrigation system
310 base framework
312 yoke
314 support framework for the solar PV panel array
316 support arm
317 yoke
318 pairs of bores
320 solar PV panel array
322 solar PV panel

The invention claimed is:

1. A system for providing autonomous solar-powered irrigation for a selected wetland site, the system comprising:
an array of one or more solar photovoltaic (PV) panels;
a DC to DC power converter;
a battery for receiving electricity therein from the array of one or more solar PV panels;
a charge controller for the array of one or more solar PV panels;
a battery monitor for the battery;
a water pump;
a controller for the water pump;
two or more plant-growth sensors selected from a group consisting of a solar radiation sensor, a light intensity sensor, a soil moisture sensor, a soil temperature sensor, an ambient temperature sensor, an ambient humidity sensor, and a water tank float sensor;
a programmable logic controller data logger (PLC) in communication with the array of one or more solar PV panels, the battery, the charge controller, the battery monitor, the pump controller, and the two or more plant-growth sensors; and
a water-tight container for housing therein the DC to DC power converter, the battery, the charge controller, the battery monitor, the pump controller, and the PLC data logger, the water-tight container provided with a demountably engageable lid;
wherein the PLC data logger is configured for wireless communications with a remote microprocessor to allow remote monitoring by an operator and to allow the operator to make remote adjustments with upper and lower limits to the array of one or more solar PV panels, the battery, the charge controller, the battery monitor, the pump controller, the two or more plant-growth sensors, and to set an alert message for wireless communication when the wireless communications show one or more sensor data is greater than the set upper limit or lower than the set lower limit; and
wherein the remote microprocessor is provided with a computer-implemented program configured for receiving wireless communications from the PLC data logger, processing the wireless communications, summarizing the wireless communications, producing reports for the wireless communications and the summarized wireless communications, and providing the reports to the operator.

2. The system according to claim 1, additionally comprising a framework configured for hinged engagement with the array of one or more solar PV panels.

3. The system according to claim 1, wherein the battery comprises a battery pack having two or more batteries in communication.

4. The system according to claim 1, wherein the computer-implemented program is additionally configured for enabling wireless communication between two or more of the operator's wireless communication-equipped computer devices and the PLC data logger.

5. A kit of parts for assembly of an autonomous solar-powered irrigation system on a wetland site, the kit comprising:

an array of one or more solar photovoltaic (PV) panels;
a DC to DC power converter;
at least one battery for receiving therein from the array of one or more solar PV panels;
a charge controller for the array of one or more solar PV panels;
a battery monitor for the battery;
a switchboard with an off/on switch for the array of one or more solar PV panels, and an off/on switch for the battery;
a water pump;
a controller for the water pump;
two or more plant-growth sensors selected from a group consisting of a solar radiation sensor, a light intensity sensor, a soil moisture sensor, a soil temperature sensor, an ambient temperature sensor, an ambient humidity sensor, and a water tank float sensor;
a PLC data logger for communication with the array of one or more solar PV panels, the battery, the charge controller, the battery monitor, the pump controller, and the two or more of the plant-growth sensors;
a computer-implemented program for installation on a remote microprocessor configured for receiving wireless communications from the PLC data logger, processing the wireless communications, summarizing the wireless communications, producing reports for the wireless communications and the summarized wireless communications, and providing the reports to the operator; and
a water-tight container for housing therein the battery, the charge controller, the battery monitor, the pump controller, and the PLC data logger, the water-tight container provided with a demountably engageable lid,
wherein the programmable logic controller data logger is configured for wireless communications with the remote microprocessor to allow remote monitoring by an operator and to allow the operator to make remote adjustments with upper and lower limits to the array of one or more solar PV panels, the battery, the charge controller, the battery monitor, the pump controller, the two or more of the plant-growth sensors, and to set an alert message for wireless communication when the wireless communications show one or more sensor data is greater than the set upper limit or lower than the set lower limit.

6. The kit of parts according to claim 5, wherein the demountably engageable lid is hingedly engaged with the water-tight container.

7. The kit of parts according to claim 5, additionally comprising a computer-implemented program for installation on an external microprocessor configured for receiving wireless communications from the PLC data logger, processing the wireless communications, summarizing the wireless communications, producing reports for the wireless communications and the summarized wireless communications, and providing the reports to the operator.

8. The kit of parts according to claim 5, wherein the computer-implemented program is additionally configured for wireless communications with a plurality of the operator's wireless communication-equipped computer devices whereby the operator is able to set upper and lower limits for one or more of the solar radiation sensor data, the light intensity sensor data, the soil moisture sensor data, the soil temperature sensor data, the ambient temperature sensor data, and the ambient humidity sensor from any one of the plurality of wireless communication-equipped computer devices.

9. The kit of parts according to claim 5, wherein the computer-implemented program is additionally configured for enabling wireless communication between the operator's plurality of wireless communication-equipped computer devices and the PLC data logger.

10. The kit of parts according to claim 5, wherein the array of one or more solar PV panels is configured for hinged engagement with the demountably engageable lid of the water-tight container.

11. The kit of parts according to claim 5, additionally comprising a framework configured for hinged engagement with the array of one or more solar PV panels.

12. The kit of parts according to claim 11, wherein the framework is additionally configured for demountable engagement therewith the water-tight container.

* * * * *